United States Patent [19]

Sogoian

[11] 3,940,165
[45] Feb. 24, 1976

[54] HANGER FOR VEHICLE MUD FLAPS
[76] Inventor: Nash P. Sogoian, 1417 21st St., Detroit, Mich. 48216
[22] Filed: Apr. 18, 1974
[21] Appl. No.: 461,870

[52] U.S. Cl. ........................................ 280/154.5 R
[51] Int. Cl.² ......................................... B62B 9/16
[58] Field of Search ............ 280/154.5 R; 298/1 SG; 403/201, 254, 259, 187

[56] References Cited
UNITED STATES PATENTS

| | | | |
|---|---|---|---|
| 2,397,151 | 3/1946 | Mitchell | 280/154.5 R X |
| 3,224,791 | 12/1965 | Sogoian | 280/154.5 R |
| 3,782,757 | 1/1974 | Juergens | 280/154.5 R |

Primary Examiner—Robert R. Song
Assistant Examiner—Michael J. Forman
Attorney, Agent, or Firm—Gifford, Chandler & Sheridan

[57] ABSTRACT

An improved deflectible hanger for vehicular mud flaps having a first and second support member, the second support member being resiliently held to and in axial alignment with the first support member by a spring-loaded cable which permits the second support member to be angularly deflected relative to the first support member and stud members secured to the first support member to rigidly attach the first support member to the vehicle frame.

2 Claims, 3 Drawing Figures

U.S. Patent  Feb. 24, 1976  3,940,165
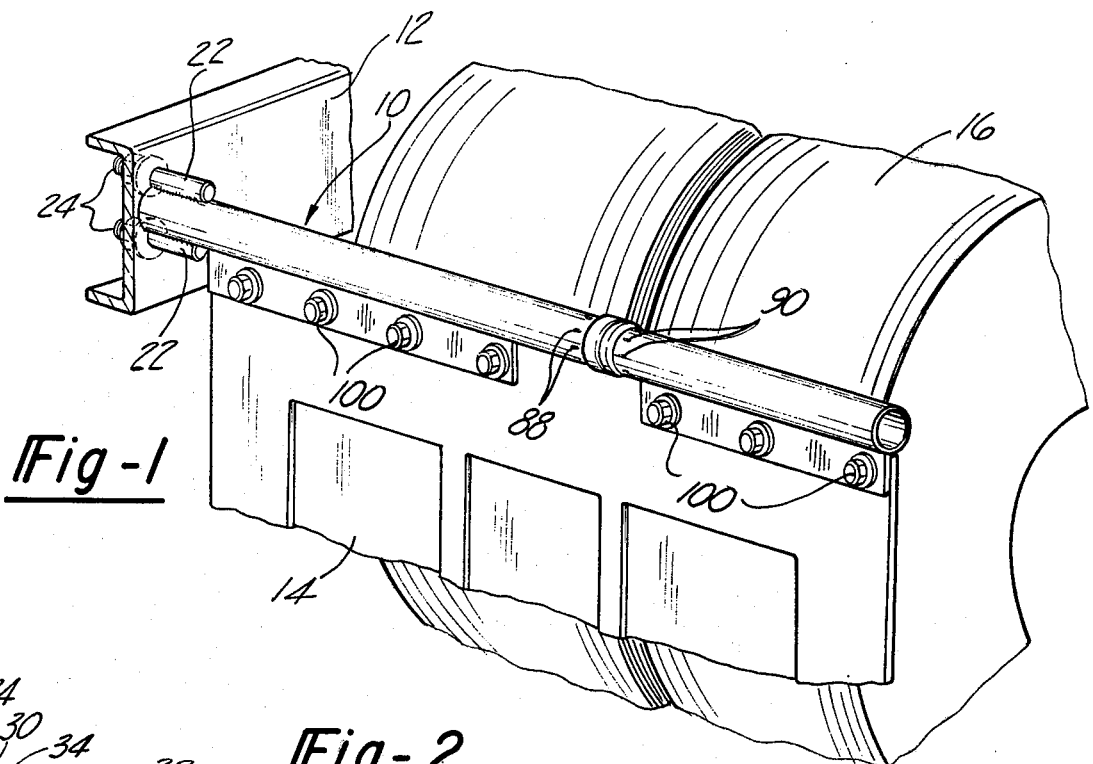
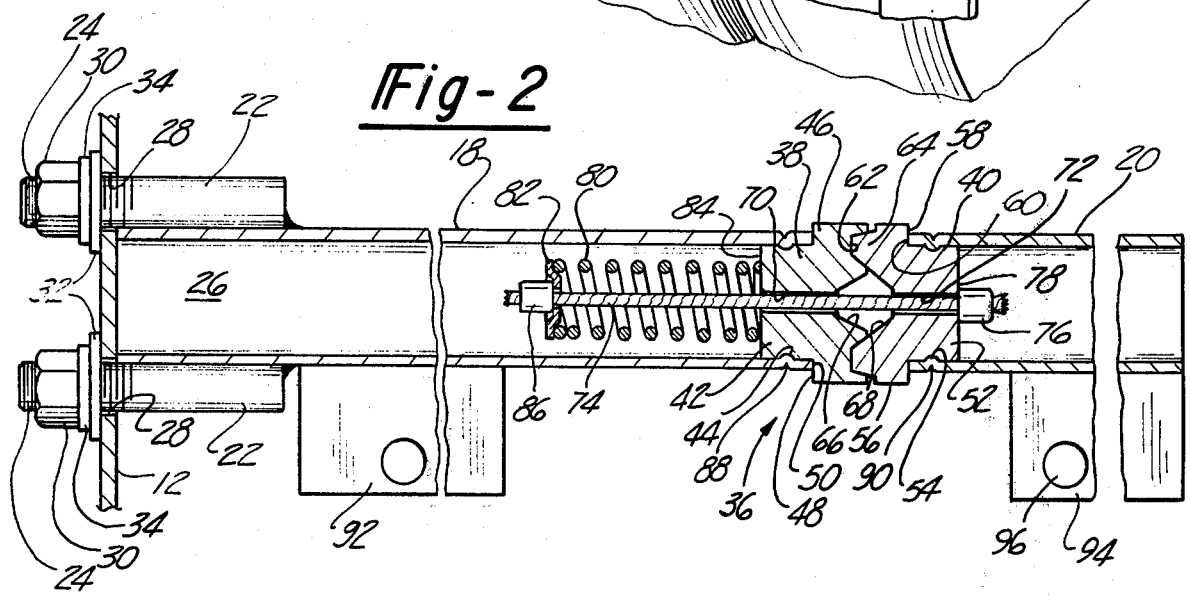
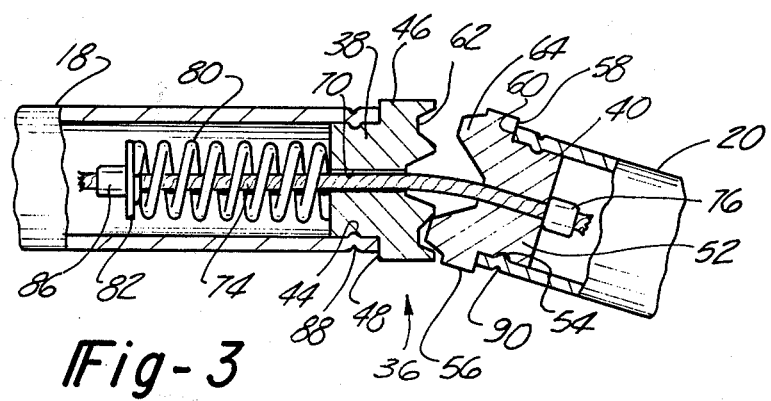

HANGER FOR VEHICLE MUD FLAPS

BACKGROUND OF THE INVENTION

I. Field of the Invention

The present invention relates to an improved hanger for vehicular mud flaps and more particularly to such a device having means permitting deflection of the mud flap support member without damage to the support member when the support member accidentally comes into contact with an obstruction and improved means for attaching the hanger to the vehicle.

II. Description of the Prior Art

In many localities it is mandatory that trucks, trailers and other similar vehicles be provided with mud flaps to prevent damage to others from rocks and other debris thrown by the wheels. The hangers for such mud flaps are often damaged by obstructions such as loading docks when the vehicle is backed into position for loading or unloading.

In order to overcome the above mentioned difficulties, vehicular mud flaps hangers having resilient means in the support members to permit the support members to deflect from their normal position, have been disclosed in the prior art, such as my U.S. Pat. No. 3,224,791, issued Dec. 21, 1965.

However, even though the device of my previous invention represents a substantial improvement over previously known mud flaps supports three disadvantages have been encountered in use. The first disadvantage of such hangers is that the resilient spring means disposed between the rigid support member and the deflectible support member of the hanger is subject to lateral deflection rather than axial deflection, and as such, the spring means is prone to fatigue and subsequent failure which typically results in replacement of the entire hanger assembly.

The second disadvantage of my previous deflectible mud flap hanger is that, when in a deflected condition, the internal spring means of the hanger are to a great extent exposed to the elements thus permitting mud, water, rocks and the like to enter into the internal workings of the hanger and to be trapped by and in the area surrounding the spring means. As more and more debris collects around the spring means, the debris not only hampers the resilient action of the spring, but also accelerates the failure of the spring and the resultant replacement of the hanger assembly.

The third disadvantage of my previous deflectible mud flap hanger is the second spring means utilized to secure the mud flap hanger to the vehicle frame has proved to be expensive to manufacture and prone to failure.

SUMMARY OF THE INVENTION

The present invention overcomes the above mentioned disadvantages of previously known deflectible hangers for vehicular mud flaps by attaching the deflectible, or second, support member to the rigid, or first, support member by a resiliently attached cable disposed intermediate of the two support members. Two substantially cylindrical mating members, one of which is adapted to receive the other, form the junction between the first and second hanger support members. The above mentioned cable is attached to one of the mating members and extends slidably and axially through the other mating member and then through a helical spring behind which the second end of the cable is fastened. The helical spring is under compression so as to bias the two support members axially toward each other and maintain the support members in axial alignment and yet permit the second support member to deflect whenever an obstruction is encountered.

An improved means is utilized to secure the first support member to the frame of the vehicle thereby obviating the spring connecting means shown in my previous aforementioned patent. Two stud members are preferably welded to the outer surface of the first support member, in parallel with the axis of the first support member and diametrically opposed to each other so that the threaded portion of the studs extends beyond the end of the first support member. The vehicle frame is provided with a pair of apertures to receive the threaded portion of the studs therethrough afterwhich the stud ends are secured by bolts.

It is therefore a primary object of the present invention to increase the life of deflectible hangers for vehicular mud flaps by providing a resiliently attached cable between the rigid and deflectible support members of the hanger assembly.

It is another object of the present invention to provide a simple but improved means to secure the mud flap hanger to the frame of the vehicle.

It is yet a further object of the present invention to provide a deflectible mud flap hanger assembly which is easily and inexpensively constructed.

BRIEF DESCRIPTION OF THE DRAWINGS

Still further objects and advantages of the present invention will become readily apparent to those skilled in the art to which the invention pertains upon reference to the following detailed description when read in conjunction with the following drawings in which like reference characters refer to like parts throughout the several views and in which:

FIG. 1 is a perspective view of a mud flap assembly of the present invention;

FIG. 2 is a longitudinal cross-sectional view of the hanger assembly of the present invention; and FIG. 3 is a fragmentary longitudinal cross-sectional view of the connecting assembly of the present invention, enlarged for clarity and shown in its deflected position.

DESCRIPTION OF THE PREFERRED EMBODIMENT

Now referring to the drawings for a more detailed description of the present invention, FIG. 1 shows the mud flap hanger 10 secured to a framing member 12 of a vehicle such as a truck or the like. The hanger 10 is adapted to carry a mud flap 14 in a position behind the wheels 16 of the vehicle.

As best seen in FIG. 2, the hanger 10 generally comprises an elongated tubular first support member 18 and a second elongated tubular support member 20. The improved means to secure the first support member 18 to the frame 12 comprises a pair of studs 22 attached to the outer surface of one end 26 of the first support member 18 substantially parallel to the longitudinal axis of the first support member 18 and diametrically opposed to each other so that the threaded portions 24 of the studs 22 extend beyond the end 26 of the first support member 22. The studs 22 are preferably welded to the exterior of the first support member 18 but may be attached to the first support member 18 by any conventional means, such as brazing, clamps and the like.

Apertures 28 are formed in the framing member 12 of the vehicle and are adapted to receive bolts 22 therethrough. Nuts 30, preferably with washers 32 and lock washes 34, are provided to rigidly secure the first support member 18 to the framing member 12 of the vehicle. It is thus obvious that the described means to secure the first support member 18 to the vehicle frame 12 is simple and inexpensive to manufacture and overcomes the previously mentioned disadvantages of the spring loaded securing means known to the prior art.

The second support member 20 is carried by the free end of the first support member 18 in a position normally axially aligned therewith by a resilient connecting means 36 which comprises the novelty of this invention and is described in greater detail hereinbelow. Referring now to FIGS. 2 and 4, the resilient connecting means 36 includes first and second substantially cylindrical mating members 38 and 40, respectively. The first member 38 includes a small diameter portion 42 having an outside diameter slightly less than the inside diameter of the first support member 18 and adapted to fit inside the first support member 18. An annular groove 44 is formed in portion 42 of the member 38 for a purpose to be later described. An enlarged diameter portion 46 of the member 38 forms an annular surface 48 with the smaller diameter portion 42 which abuts against the end surface 50 of the tubular first support member 18. Similarly, the second member 40 includes a small diameter portion 52 with an annular groove 54 adapted to fit within the tubular second support member 20. Likewise, an enlarged diameter portion 56 forms an annular surface 58 which abuts against the end surface 60 of the second support member 20.

An annular recess 62 is formed in the first mating member 38 on the surface adjacent to the second mating member 40 and is adapted to receive and register with an annular ridge 64 formed on the second member 40. Two generally opposing cone-shaped recesses 66 and 68 are formed in the central adjacent regions and preferably substantially along the longitudinal axis of the mating members 38 and 40, respectively, for a purpose to be later described. Apertures 70 and 72 are also respectively formed through the longitudinal axis of mating members 38 and 40.

A cable 74, preferably of braided steel construction and of slightly less diameter than apertures 70 and 72, is disposed through apertures 70 and 72 and has a cable stop, or clamp 76 fastened to one end thereof. The cable stop 76 has a diameter larger than the diameter of the aperture 72, and, as such, will abut against surface 78 of the mating member 40 and prevent the cable 76 from passing completly through the aperture 72.

The opposite end of the cable 74 from that described above passes through a helical spring 80 and washer 82, disposed behind surface 84 of the first mating member 38 and substantially in axial alignment with the aperture 70. With the spring 80 under compression between the surface 84 of the mating member 38 and the washer 82, a second cable stop 86, with a diameter larger than the aperture through washer 82, is clamped or pressed onto cable 76 in any conventional fashion so that when the connecting means 36 is thus far assembled, the spring 80 is in a state of compression. It should be appreciated that with the spring 80 in a state of compression mating members 38 and 40 are maintained in axial alignment with ridge 64 registering with recess 62.

The connecting means 36 is preferably completely assembled externally from either of the support members 18 or 20, after which the first mating member 38 along with the spring 80 and its associated components is inserted into the free end of the tubular first support member 18. With the preferred form of construction, a number of indentations 88 are formed in the first support member 18 in the region immediately above the annular groove 44 around the first mating member 38 in the support member 18. Similarly, the second mating member 40 is inserted into the second support member 20 which is indented at 90 to firmly lock the second mating member 40 into the second support member 20.

Longitudinally extending flanges 92 and 94 are carried on the outer surface of the support members 18 and 20 respectively. Horizontally spaced perforations 96 provide the means by which the mud flap 14 may be secured to the hanger 10 by bolts 100 or the like as best shown in FIG. 1.

In operation the spring 80, which is under compression, normally biases the mating members 38 and 40 axially toward each other, so that the longitudinal axis of the second support member 20 is substantially aligned with the longitudinal axis of the first support member 18 as best shown in FIGS. 1 and 2. However, when the mud flap 14 encounters an obstruction, the second support member 20 may deflect from its normal position by extending the cable 74 outwardly from the vehicle and simultaneously compressing spring 80, as best shown by FIG. 3. Conical surfaces 66 and 68 on the mating members 38 and 40 provide a smooth surface contact for the cable 74 and thereby serve to increase the life of the cable 74.

After the momentary deflection of the support member 20, the spring 80 will return the support member 20 to its normal, axially aligned position with the first support member 18. It should also be noted that while the second support member 20 is in its deflected position at least some portion of the ridge 64 remains in contact with the recess 62 so that the second support member 20 will return to substantially its original position at the end of its deflection.

It will be apparent to those skilled in the art that the spring 80 of the present invention is subject only to axial displacement or compression, rather than lateral bending and twisting as in the device of my previous invention and this greatly increases the life of the spring 80. Furthermore, because the spring 80 of the present invention unlike my previous device, is protected from the elements by the mating member 38 and the first support member 18, the life of the spring 80 is even moreso extended.

Although I have described but one embodiment of the present invention, it is obvious that many changes and modifications can be made without departing from the spirit of the invention or the scope of the appended claims.

I claim:

1. A hanger for a vehicular mud flap comprising an elongated tubular first support member, means carried at one end of said first support member for mounting said first support member to a vehicle, an elongated tubular second support member carried at the free end of said support member and in axial alignment therewith, means carried longitudinally on said first and second support members for securing a mud flap thereto, a helical spring in a state of compression disposed within one of said support members and having one end attached to the free end of said helical spring and having the other end of said cable attached to the other of said support members, a first mating member disposed at the free end of said first support member, and a second mating member disposed in the attached end of said second support member adjacent said first mating member, wherein one of said mating members includes an annular ridge adapted to register with a cooperating annular recess formed on the other of said mating members, wherein the means carried at one end of said first support member for mounting said first support member to said vehicle frame comprises a pair of studs welded to the outer periphery of said first support member substantially parallel with the longitudinal axis of said first support member and substantially diametrically opposed to each other so that the threaded portions of said studs extend beyond the end of said first support member, said frame being provided with a pair of apertures adapted to receive said stud threaded portions therethrough and locking means adapted to engage said stud threaded portions after extension of said stud threaded portion through said apertures.

2. The invention as defined in claim 1 wherein said locking means are a pair of nuts.

* * * * *